United States Patent
Henderson et al.

(10) Patent No.: US 7,245,929 B2
(45) Date of Patent: Jul. 17, 2007

(54) ENABLING TEXT MESSAGING BETWEEN A MEMBER AND NON-MEMBER OF A COMMUNITY BASED ON A COMMON SHORT CODE

(75) Inventors: Irvin Henderson, Palo Alto, CA (US); Naveen D. Sanjeeva, Milpitas, CA (US); Thyagarajapuram S. Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 11/175,988

(22) Filed: Jul. 5, 2005

(65) Prior Publication Data

US 2007/0010265 A1    Jan. 11, 2007

(51) Int. Cl.
*H04Q 7/20* (2006.01)

(52) U.S. Cl. .................. 455/466; 455/414.1; 455/418; 455/445; 709/228; 709/236; 370/351

(58) Field of Classification Search ................ 455/466, 455/414.1, 412.1, 418, 445; 709/228, 236; 370/351
See application file for complete search history.

(56) References Cited

U.S. PATENT DOCUMENTS 7,039,390 B1 * 5/2006 Hohne et al. ............... 455/406
2003/0114174 A1 * 6/2003 Walsh et al. ................. 455/466
2004/0266462 A1 * 12/2004 Chava et al. ................ 455/466
2004/0266464 A1 * 12/2004 Lehtikangas et al. ........ 455/466

* cited by examiner

Primary Examiner—Danh Le
(74) Attorney, Agent, or Firm—Darby & Darby PC; Matthew M. Gaffney

(57) ABSTRACT

Enabling a user of a device, such as a wired or wireless device, that is associated with a telephone number to communicate text messages with another user of another device that is not associated with a telephone number (or the telephone number is unknown to the sender). Although the other user's telephone number is not known or does not exist, the other user is associated with a user identifier for a user community that is assigned a Common Short Code (CSC). The text message includes a source telephone number (sender/user's device telephone number) and a destination number (the CSC for the other user/recipient's user community). The content of the text message includes a user identifier, where the identifier indicates the particular other user within the user community. A server employs the CSC to determine the user community and the identifier to determine the particular user in the determined community that is the intended recipient of the text message.

20 Claims, 9 Drawing Sheets

ENABLING TEXT MESSAGING BETWEEN A MEMBER AND NON-MEMBER OF A COMMUNITY BASED ON A COMMON SHORT CODE

FIELD OF THE INVENTION

The present invention relates generally to communicating messages over a network, and in particular, to an apparatus and method for enabling an SMS message including a user ID of a member of a user community to be sent to the user.

BACKGROUND OF THE INVENTION

The use of mobile technologies is steadily on the increase, for both business and personal uses. Mobile phones are a common site today and many people own personal information management (PIM) devices, palmtop computers, and so forth, to manage their schedules, contacts, and to stay connected with friends, family, and work. Employees on the move often appreciate the value of staying connected with their business through their mobile devices.

With such a variety of mobile devices, one can receive email messages, Instant Messaging (IM) messages, and Short Message Service (SMS) text messages, in addition to regular voice calls. With the growing proliferation of such mobile devices, it is becoming ever more important to ensure that employees, friends, and family are able to remain seamlessly connected to each other as they transition from a home or office based stationary computing device to a mobile situation. Therefore, it is with respect to these considerations and others that the present invention has been made.

A common short code (CSC) is a five digit number that a wireless carrier can use to send an SMS message, instead of using a telephone number. A CSC is registered in a similar manner to which domain names are registered. The Common Short Code Administrator (CSCA) assigns a CSC to a particular applicant, which enables the applicant to subsequently use the CSC (instead of a telephone number) for SMS or text messaging across multiple wireless service providers.

BRIEF DESCRIPTION OF THE DRAWINGS

Non-limiting and non-exhaustive embodiments of the present invention are described with reference to the following drawings, in which.

DETAILED DESCRIPTION OF THE INVENTION

Figure 1:
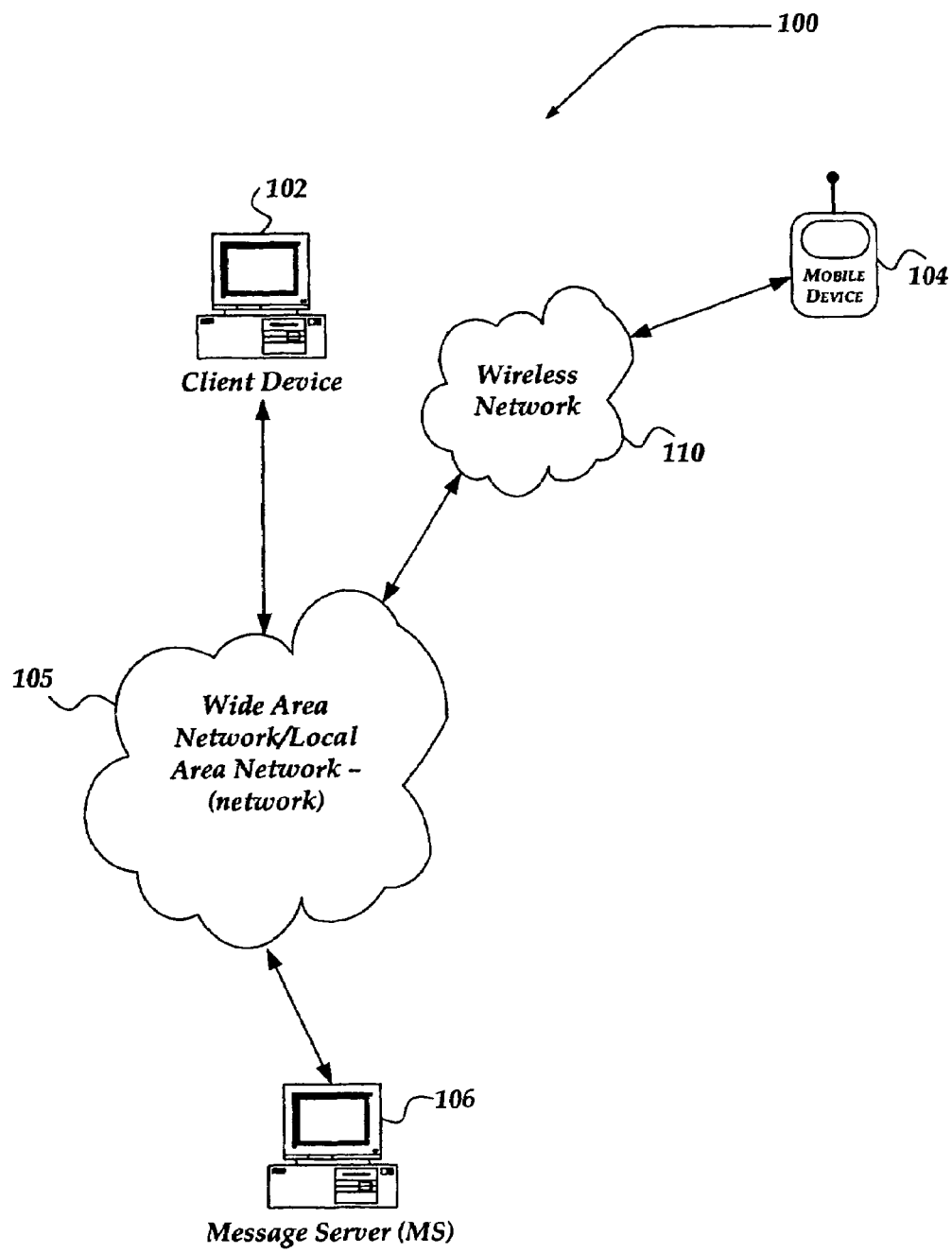
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may.

Briefly stated the invention is related to a method and apparatus for enabling a user of a device, such as a wired or wireless device, that is associated with a telephone number to communicate text messages with another user of another device that is not associated with a telephone number (or the telephone number is unknown to the sender). Although the other user's telephone number is not known or does not exist, the other user is a member of a user community that is assigned a Common Short Code (CSC).

In one embodiment, the user employs a mobile device to send a text message to another user that is a member of a user community which has a CSC assigned to it. The text message includes a source telephone number (sender/user's mobile device telephone number) and a destination number (the CSC for the other user/recipient's user community). The content of the text message includes a user identifier, where the identifier indicates the particular other user within the user community. In one embodiment, a server employs the CSC to determine the user community and the identifier to determine the particular user in the determined community that is the intended recipient of the text message.

Also, for the originating telephone number, the server associates a short code extension with the recipient's user identifier. The server subsequently forwards the text message in a format suitable for display by a messaging client that is associated with the other user/intended recipient. Furthermore, if the recipient of the text message responds to the sender, the server sends the text message response using the CSC and the short code extension as the originating number for the response.

Additionally, the devices communicating text messages can be a wired and/or wireless device such as a Personal Computer (PC), Network Appliance, notebook computer, or another mobile device, such as a pager, Personal Digital Assistant (PDA), or mobile telephone, and the like. Also, the user community can be an Instant Messaging (IM) community, email community, Internet Relay Chat (IRC) community, and the like. In another embodiment, a host computer or a peer computer performs substantially the same actions as the server. Also, in yet another embodiment, the recipient of a text message may be associated with a plurality of wired and/or wireless devices, and the text message can be converted into one or more formats and forwarded to different messaging clients on different devices that are selected by the recipient to receive text messages.

Illustrative Operating Environment

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(collectively, "network 105"), wireless network 110, Message Server (MS) 106, client device 102, and mobile device 104. Client device 102 is in communication with mobile device 104 through MS 106, network 105, and wireless network 110.

Generally, client device 102 may include virtually any computing device capable of receiving and sending a message over a network, such as network 105, wireless network 110, and the like, to and from another computing device, such as MS 106, mobile device 104, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 also may be any computing device that is capable of connecting using a wired or wireless communication medium such as a PDA, POCKET PC, laptop computer, wearable computer, mobile phone and any other device that is equipped to communicate over a wired and/or wireless communication medium.

Client device 102 may include a browser application that is configured to receive and to send web pages, web-based messages, and the like. The browser application may be configured to receive and display graphics, text, multimedia, and the like, employing virtually any web based language, including Standard Generalized Markup Language (SMGL), HyperText Markup Language (HTML), eXtensible Markup Language (XML), and so forth.

Client device 102 may further include a client application that enables it to perform a variety of other actions, including, communicating a message, such as through a Multimedia Message Service (MMS), instant messaging (IM), Short Message Service (SMS), internet relay chat (IRC), Mardam-Bey's IRC (mIRC), Jabber, and the like, between itself and another computing device. The browser application, and/or another application, such as the client application, a plug-in application, and the like, may enable client device 102 to communicate content to another computing device, such as mobile device 104.

Mobile device 104 represents one embodiment of a client device that is configured to be portable. Thus, mobile device 104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile device 104 typically ranges widely in terms of capabilities and features.

For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, XML, and the like, to display and send a message.

Mobile device 104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile device 104 may uniquely identify itself through any of a variety of mechanisms, including a phone number, Mobile Identification Number (MIN), an electronic serial number (ESN), Mobile Subscriber Integrated Services Digital Network (MS-ISDN), or other mobile device identifier.

Mobile device 104 may also be configured to communicate a message, such as through a SMS, MMS, IM, IRC, mIRC, Jabber, and the like, between another computing device, such as MS 106, client device 102, and the like. However, the present invention is not limited to these message protocols, and virtually any other message protocol may be employed.

Client device 102 and mobile device 104 may be further configured to enable a user to participate in a communication over a network. As such, client device 102 and mobile device 104 may include a client application that is configured to manage various actions on behalf of the client device. For example, the client application may enable a user to interact with the browser application, email application, IM applications, SMS application, and the like, to manage signing into a communications session, such as an IM session, between the devices. Also, client device 102 may send a message via message server MS 106 rather than sending a message directly.

Client device 102 may further be configured to include a client application that enables the end-user to log into an end-user account that may be managed, at least in part, by MS 106. Such end-user account, for example, may be configured to enable the end-user to receive emails, send/receive IM messages, SMS messages, access selected web pages, and the like. Moreover, the end-user account may be further configured to enable the end-user authorization to automatically start a communications session, such as an SMS session, and the like, on mobile device 104.

In one embodiment, client device 102 may be a member of a user community, such as an IM community that is managed, at least in part, by MS 106. Each member of the user community may have a unique user ID that is used to identify the member.

Wireless network 110 is configured to couple mobile device 104 and its components with network 105. Wireless network 110 may include any of a variety of wireless sub-networks that may further overlay stand-alone ad-hoc networks, and the like, to provide an infrastructure-oriented connection for mobile device 104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device 104 and another computing device, network, and the like.

Network 105 is configured to couple MS 106 and its components with other computing devices, including, client device 102, MS 106, and through wireless network 110 to mobile device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between MS 106 and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of MS 106 is described in more detail below in conjunction with FIG. 3. Briefly, however, MS 106 may include any computing device capable of connecting to network 105 to manage message communications between one or more computing devices, such as between client device 102 and mobile device 104.

MS 106 may be further configured to provide and manage end-user accounts that are configured to provide such services to the end-user as, for example, email, access to games, selected web pages, chat sessions, IM sessions, SMS sessions, social networks, and the like. However, the present invention is not constrained by such examples, and more or less services may be provided, without departing from the scope or spirit of the invention.

In one embodiment, a user of mobile device 104 may send an SMS message to a Common Short Code (CSC) that is assigned to a user community. The SMS message may also include a user ID (of an intended recipient of the message) in a specific syntax recognized by MS 106 (e.g. "SMS <userid> <text message>"). In this embodiment, MS 106 is configured to provide the content of the SMS message (e.g. <textmessage>) to a message client for the intended recipient, which is associated with the user ID (e.g. <userid>) of the user community that is assigned to the CSC.

Devices that may operate as MS 106 include personal computers desktop computers, multiprocessor systems, microprocessor-based or programmable consumer electronics, network PCs, servers, and the like.

Although FIG. 1 illustrates MS 106 as a single computing device, the invention is not so limited. For example, one or more functions of MS 106 may be distributed across one or more distinct computing devices. For example, IM sessions may be managed by a different computing device than are web services. Similarly, SMS sessions, authentication, and the like, may reside on different computing devices, without departing from the scope or spirit of the present invention.

Illustrative Mobile Client Environment

Figure 2:
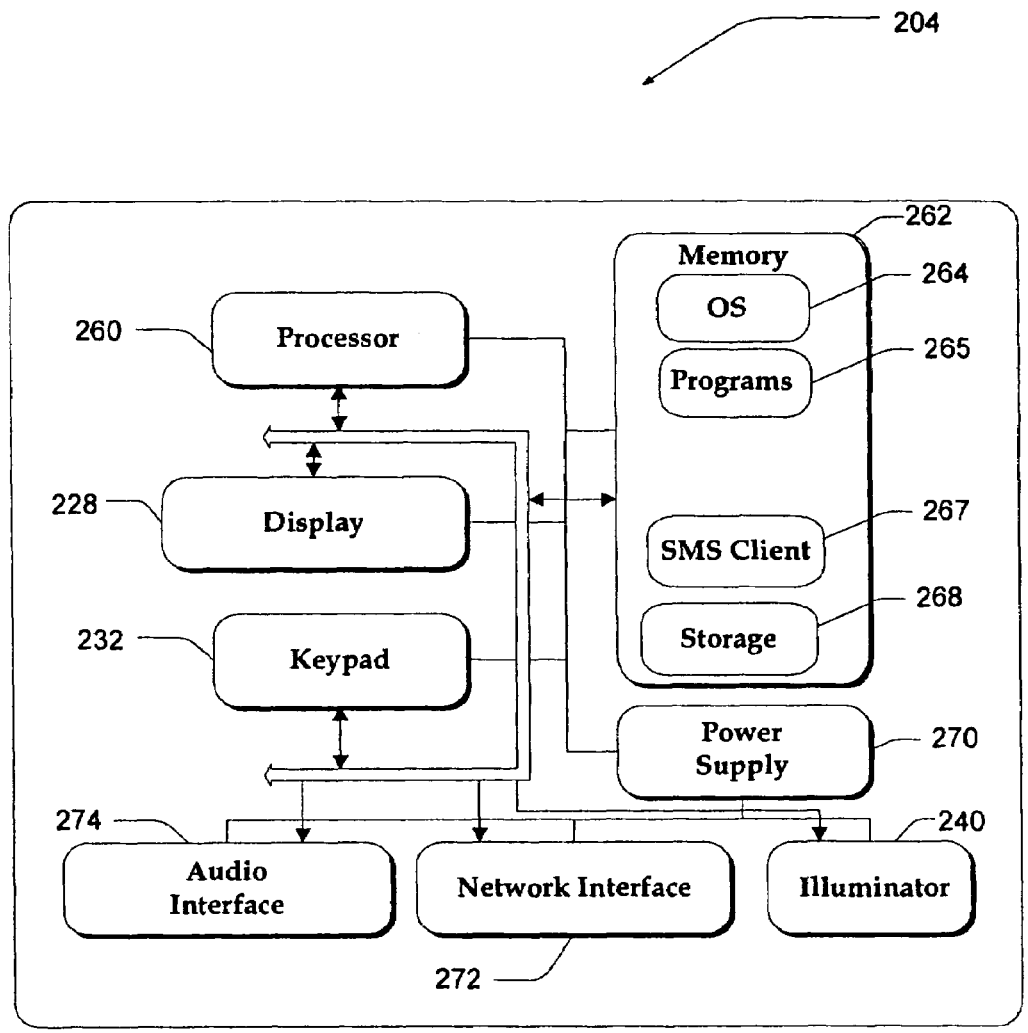
FIG. 2 illustrates a block diagram of an embodiment of the mobile device of FIG. 1.

FIG. 2 is a functional block diagram illustrating an embodiment of one embodiment of communications device 204 for practicing the present invention. In one embodiment of the present invention communications device 204 is implemented as a mobile communications device, such as a PDA, smart phone, and the like that is arranged to send and receive voice communications, and other messages, such as IM messages, SMS messages, and the like via one or more wireless communication interfaces. Communications device 204 may also include handheld computers, tablet computers, personal computers, multiprocessor systems, microprocessor-based or programmable consumer electronics, network PCs, wearable computers, and the like. Communications device 204 may be employed as an embodiment of, for example, mobile device 104 of FIG. 1.

Communications device 204 may include many more components than those shown in FIG. 2. The components shown, however, are sufficient to disclose an illustrative embodiment for practicing the invention.

As shown in the figure, communications device 204 includes processor 260, memory 262, display 228, and keypad 232. Memory 262 generally includes both volatile memory (e.g., RAM) and non-volatile memory (e.g., ROM, Flash Memory, or the like). Communications device 204 includes operating system 264, which may be resident in memory 262 and configured to execute on processor 260 for use in controlling operations of communications device 204. It will be appreciated that this component may include a general purpose operating system such as a version of UNIX, LINUX™, and the like, or a specialized mobile communication operating system such as Windows Mobile™, Symbian®, or the like. The operating system may further include, or interface with a Java Virtual Machine module that enables control of various hardware components and/or operating system operations via Java application programs, and the like. Moreover, memory 262 may include components such as MIDP 1.0 APIs, J2ME components, and the like.

Keypad 232 may be a push button numeric dialing pad (such as on a typical telephone), a multi-key keyboard (such as a conventional keyboard), and the like. Display 228 may be a liquid crystal display (LCD), gas plasma, light emitting diode (LED), or any other type of display useable in a mobile communications device. For example, display 228 may be touch-sensitive, and may then also act as an input device enabling entry of stencil input, touch display, and so forth.

One or more programs 266 may be loaded into memory 262 and run on the operating system 264. Programs 266 may include computer executable instructions which, when executed by mobile communications device 204, also transmit, receive, and/or otherwise process web pages, audio, videos, graphics, and enable telecommunication with another computing device. Other examples of programs 266 include calendars, contact managers, task managers, transcoders, email programs, scheduling programs, browsers, word processing programs, spreadsheet programs, games, and the like. In addition, memory 262 may include SMS client 267.

Communications device 204 also includes non-volatile storage 268 within memory 262. Non-volatile storage 268 may be used to store persistent information which is intended not to be lost if the communications device 204 is powered down. Programs 266 may use and store information in storage 268, such as e-mail or other messages used by an e-mail application, databases, documents used by a word processing application, and the like.

Communications device 204 also may include power supply 270, which may be implemented as one or more batteries, solar devices, and the like. Power supply 270 might further include an external power source, such as an AC adapter or a powered docking cradle that supplements or recharges the batteries.

Communications device 204 is also shown with two types of external notification mechanisms: illuminator 240 and audio interface 274. These devices may be directly coupled to power supply 270 so that when activated, they remain on for a duration dictated by the notification mechanism even though processor 260 and other components might shut down to conserve battery power. Illuminator 240 may be programmed to remain on indefinitely until the user takes action to indicate the powered-on status of the device. Audio interface 274 may be used to provide audible signals to and receive audible signals from the user. For example, audio interface 274 may be coupled to a speaker for providing audible output and to a microphone for receiving audible input, such as to facilitate a telephone conversation.

Communications device 204 also includes network interface 272 that performs the function of transmitting and receiving external communications. Network interface 272 facilitates, for example, wireless connectivity between communications device 204, and the outside world, via a communications carrier or service provider. Transmissions to and from network interface 272 may be conducted under control of operating system 264. In other words, communications received by network interface 272 may be disseminated to programs 266 via operating system 264, and vice versa. Network interface 272 also allows communications device 204 to communicate with other computing devices, such as over a network, using a variety of wired communications mechanisms and technologies, including global system for mobile communications (GSM), Enhanced GSM (EDGE), code division multiple access (CDMA), CDMA 2000, WCDMA, time division multiple access (TDMA), user datagram protocol (UDP), transmission control protocol/Internet protocol (TCP/IP), SMS, general packet radio service (GPRS), Wireless Application Protocol (WAP), ultra wide band (UWB), IEEE 802.16 Worldwide Interoperability for Microwave Access (WiMax), IEEE 802.11X, and the like. Network interface 272 is sometimes known as a transceiver or transceiving device, and is one example of a communication media.

Illustrative Server Environment

Figure 3:
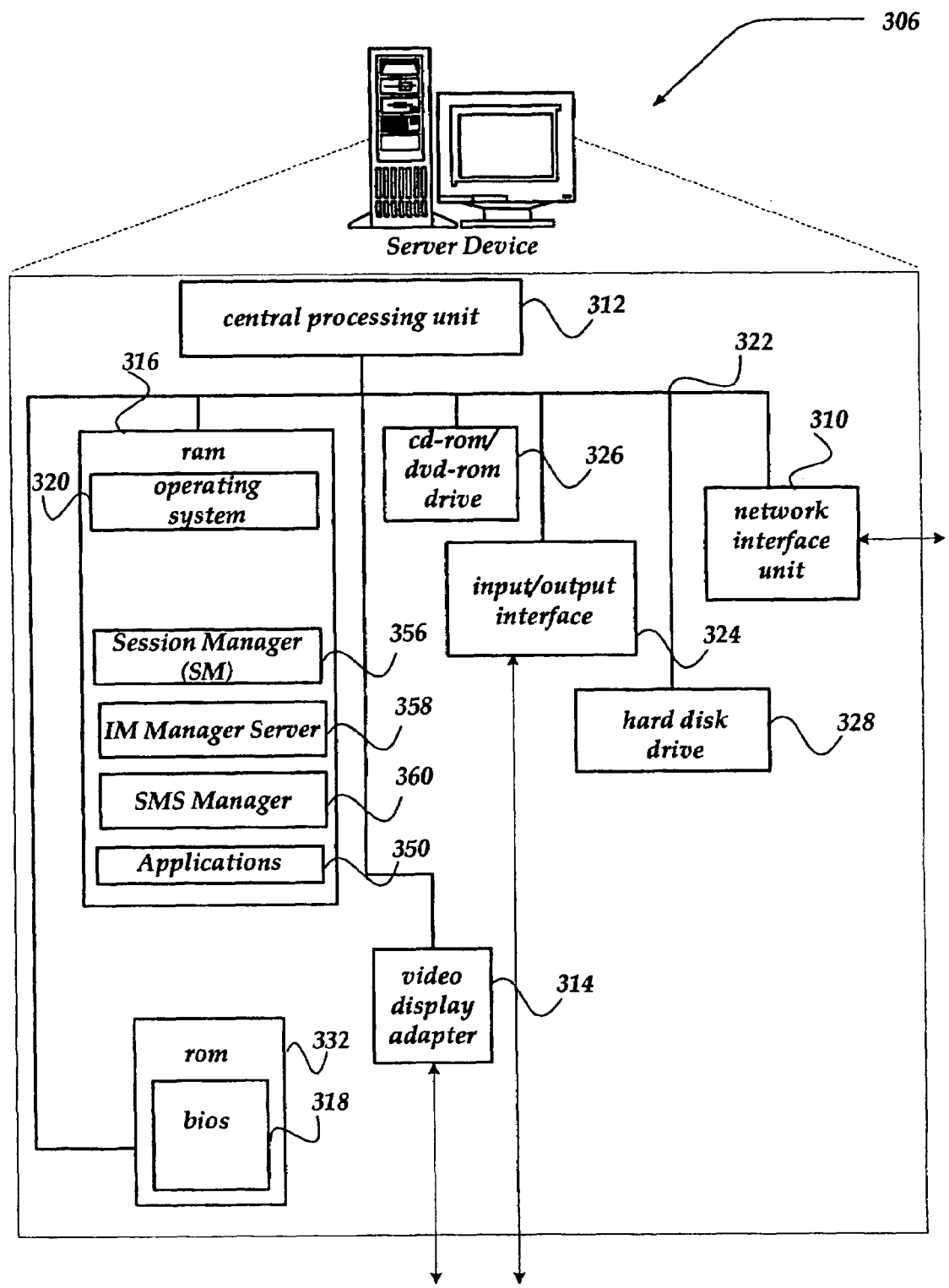
FIG. 3 shows a block diagram of an embodiment of the server device of FIG. 1.

FIG. 3 shows one embodiment of a server device, according to one embodiment of the invention. Server device 306 may include many more components than those shown. The components shown, however, are sufficient to disclose an illustrative embodiment for practicing the invention. Server device 306 may, for example, represent MS 106 of FIG. 1.

Server device 306 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 306. Any general-purpose operating system may be employed. Basic input/output system ("BIOS") 218 is also provided for controlling the low-level operation of server device 306. As illustrated in FIG. 3, server device 306 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 306 may also include an SMTP handler application for transmitting and receiving email. Server device 306 may also include an HTTP handler application for receiving and handing HTTP requests, and an HTTPS handler application for handling secure connections. The HTTPS handler application may initiate communication with an external application in a secure fashion.

Server device 306 also includes input/output interface 324 for communicating with external devices, such as a mouse, keyboard, scanner, or other input devices not shown in FIG. 3. Likewise, server device 306 may further include additional mass storage facilities such as CD-ROM/DVD-ROM drive 326 and hard disk drive 328. Hard disk drive 328 is utilized by server device 306 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, database programs, word processing programs, spreadsheet programs, and so forth. Mass storage may further include applications such as Session manager 356, IM manager server 358, and SMS manager 360.

IM manager server 358 includes virtually any server application configured to manage an IM session with another computing device. Similarly, SMS manager 360 includes virtually any server application configured to manage an SMS message session with another computing device. Although only these two communications managers are illustrated, it is clear that the invention is not so limited and virtually any message communications manager may be employed.

In addition, server device 306 may be configured to manage end-user accounts that are configured to provide such services to an end-user as, for example, email, access to games, selected web pages, chat sessions, IM sessions, SMS sessions, social networks, and the like. However, the present invention is not constrained by such examples, and more or less services may be provided, without departing from the scope or spirit of the invention. In one embodiment, an account identifier (i.e. user ID) and password is employable to enable an end-user to access such services. In one embodiment, the end-user accounts reside within server device 306. In another embodiment, the end-user accounts, and/or management thereof, are distributed across one or more computing devices.

As previously discussed, server device 306 may be configured to manage end-user accounts as part of a user community. Each user in the user community may have a user ID to uniquely identify the user. In one embodiment, the user may log into his account by entering user's user ID and password at a log-in website. Additionally, other log-in methods may be provided.

In one embodiment, server device 306 enables a user to send a text message to another user with the SMS transport based on a contact associated with the user. The user's contact information for other users, organizations and/or businesses, such as street addresses, email addresses, Instant Messaging IDs, and telephone numbers, may be stored by server device 306. Also, the user may send the text message to a destination telephone number that is not associated with another user included in the contact information. As previously discussed, a particular CSC may be associated with the user community. When server device 306 sends the SMS message initiated by the user, it can use the CSC associated with the user's user community, as well as a short code extension as the originating telephone number of the SMS message. Consequently, when the SMS message is responded to with another SMS message by the recipient, the server device can use the short code extension to determine which user to send the other SMS message to. Each short code extension can be assigned to a particular user for a particular SMS destination phone number. In one embodiment, each short code extension is three digits.

For example, for a telephone number of (333)333-3333, server device 306 may associate short code extension 401 with user54, short code extension 402 with user92, and short code extension 403 with john_smith. Server device 306 may also associate, for a telephone number of (444)444-4444, short code extension 401 with user92. If server device 306 is used to send an SMS message from user92 to a device with telephone number (444)444-4444, server device 306 may send the SMS message to telephone number (444)444-4444 with an originating phone number of CCCCC-401, where CCCCC represents the CSC for the user community. Next, the device with a telephone number of (444)444-4444 may respond to the SMS message with another SMS message, which is sent to CCCCC-401. Server device 306 looks up the user ID associated with short code extension 401 for telephone number (444)444-4444, which is user92 in this case. Then, server device 306 may send the content of the response to user92. If the SMS message had instead been sent from telephone number (333)333-3333, then the content of the message would be sent to user54 instead.

Accordingly, a text message may be sent from a mobile device to a member of a user community if the member previously sent an SMS message to the mobile device, by responding to a previous SMS message. The response is sent to the CSC and short code extension, and routed to the appropriate user based on the short code extension and the telephone number of the mobile device. However, if the user has not previously sent an SMS message to the mobile device, a short code extension is not established.

However, in one embodiment of a method according to aspects of the present invention, a mobile device user may send an SMS message to a member of a user community even though the member does not know the telephone number of the member, even if the mobile device user is not a member of the user community or is not logged in to the account associated with the user community, and even if the member has not previously sent a message to the mobile device user. In this embodiment, the mobile device user just provides the user ID of the member. In one embodiment, the mobile device user sends an SMS message that begins with "SMS <userid>", wherein <userid> represents the user ID of the member. In other embodiments, a different syntax may be employed. In one embodiment, the SMS message is sent to the CSC associated with the user community, without including a short code extension. An embodiment of the method is illustrated and described below with regard to FIG. 4.

Illustrative Operation

Figure 4:
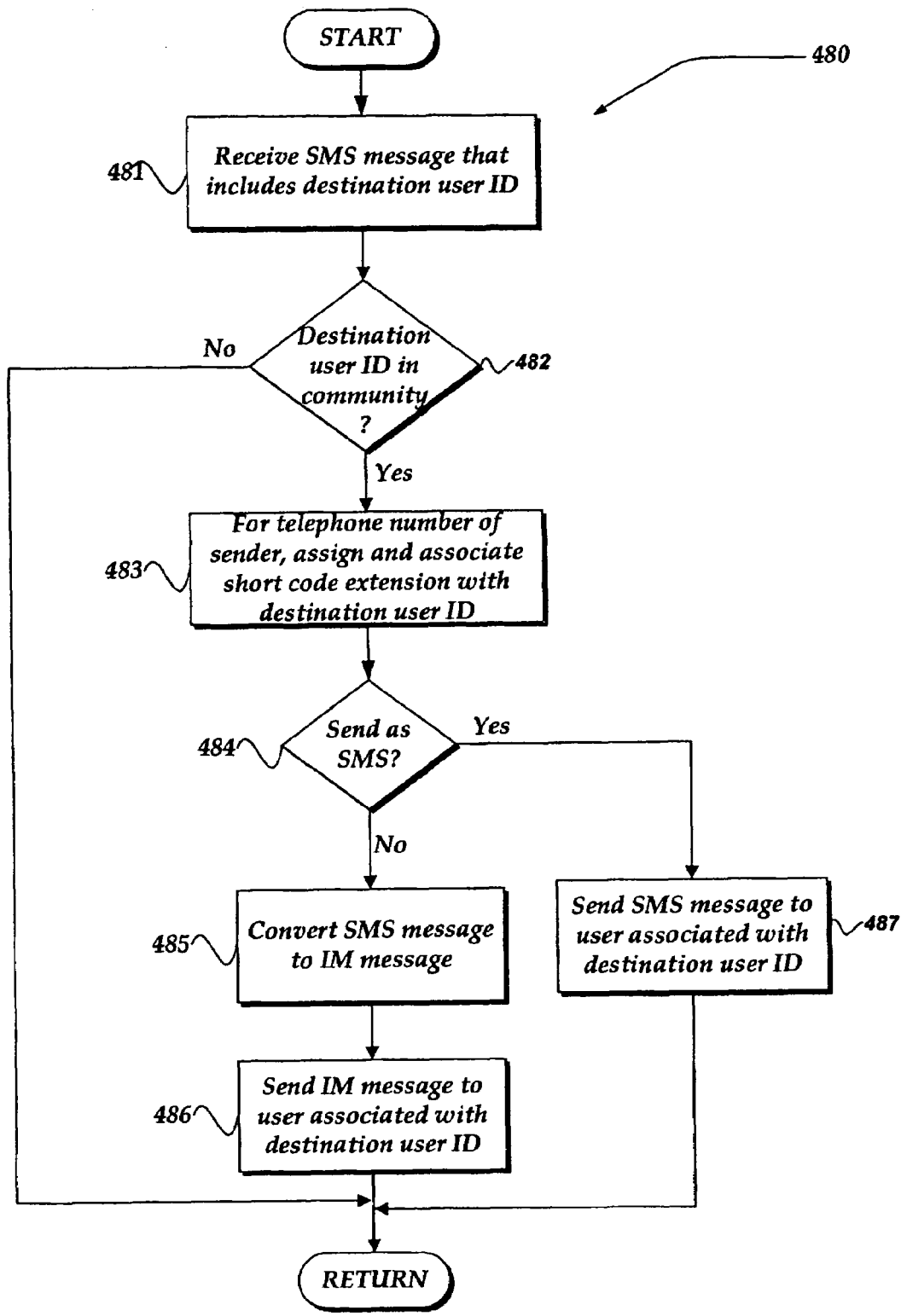
FIG. 4 illustrates a flowchart of an embodiment of a process for initiating an SMS message to a client.

FIG. 4 illustrates a flowchart of an embodiment of process 480. At a start block, an SMS message is sent to a common short code (CSC) assigned to a user community. In one embodiment, the SMS message uses the syntax "SMS <userid> <text message>", where <userid> represents the destination user ID for the SMS message, and where <text message> represents a text message. In other embodiments, a different syntax may be employed. After the start block, the process proceeds to block 481, where the SMS message is received by a server (e.g. server device 306 of FIG. 3). The process then advances to decision block 482, where a determination is made as to whether the destination user ID included in the SMS message is a valid user ID in the user community. If not, the process proceeds to a return block, where other processing is resumed. However, if the determination is at decision block 482 is positive, the process moves to block 483.

At block 483, for the originating telephone number of the SMS message, a short code extension is associated with the destination user ID. In one embodiment, the association is unique to the originating telephone number; for other telephone numbers, the same short code extension may be associated with a different destination user ID, or may be unassigned.

The process then proceeds to decision block 484, where a determination is made as to whether the text message should be sent to the destination user (i.e. the user associated with the destination user ID) as an SMS message. In one embodiment, the message is sent to the session as an IM message by default, but may instead be sent as an SMS message, for example, if the destination user is not logged in to the end-user account. If the determination is positive, the process moves to block 487. However, if the determination is negative, the process advances to block 485, where the SMS message is converted into an IM message. The process then moves to block 486, where the IM message is sent to the destination user. The process then proceeds to a return block, where other processing is resumed.

At block 487, the SMS message is sent to the destination user. The process then advances to the return block.

Although providing the message to the user as an IM message or an SMS message has been discussed herein, other embodiments are within the scope and spirit of the invention. For example, in one embodiment, the message may be converted into an email, and/or the like.

By associating the short code extension with the destination user ID, the server enables the user to respond to the SMS message, as discussed below with regard to FIG. 5.

Figure 5:
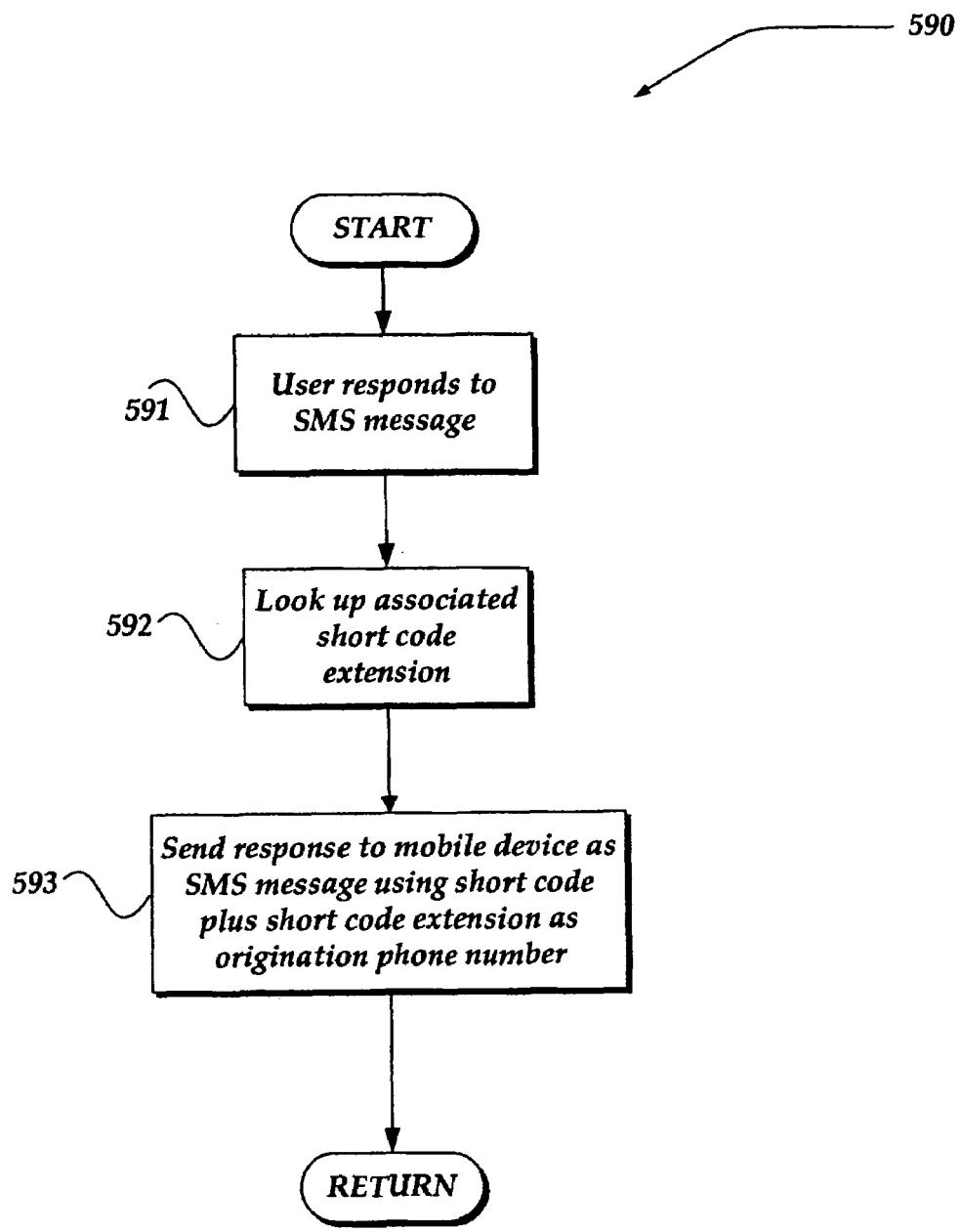
FIG. 5 shows a flowchart of an embodiment of a process for responding to the SMS message.

FIG. 5 shows a flowchart of an embodiment of process 590, which may be employed for responding to the SMS message. After a start block, the process moves to block 591, where the user (e.g. the user associated with the destination ID as discussed above with regard to FIG. 4) responds to the SMS message. As previously discussed, the SMS message may have been converted to an IM message, or the like, before it was received by the destination user. In any case, the server (e.g. server device 306 of FIG. 3) enables the user to respond to the message.

The process then proceeds to block 592, where the server looks up the server code extension that is associated with the user ID of the responder for the originating telephone number of the SMS message. The process then advances to block 593, where the server sends the response to the sender the SMS message using the short code and the short code extension that was determined at block 592 as the origination phone number of the response. The response is sent as another SMS message.

Figure 6A:
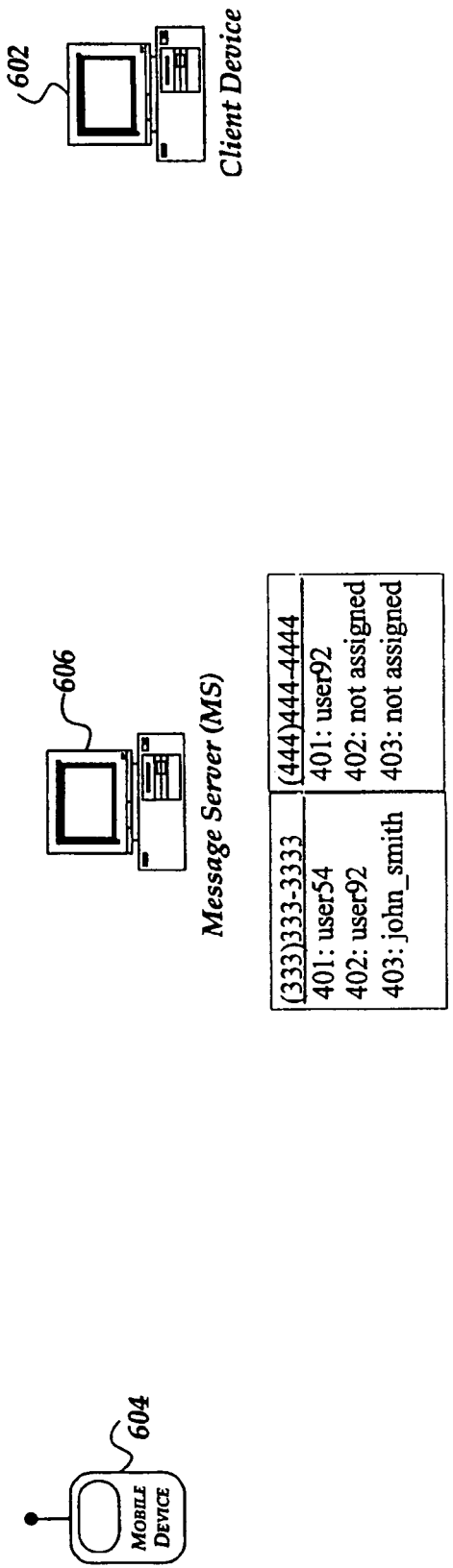
FIGS. 6A-6D show a simplified example of mobile-to-PC communication, in accordance with aspects of the present invention.

FIGS. 6A-6D shows a simplified example of the operation according to one embodiment. Each of FIGS. 6A-6D show an embodiment of client device 602, MS 606, and mobile device 602, which may operate in a substantially similar manner as similarly named components discussed above, albeit different in some ways. For the embodiment described in FIGS. 6A-6D, a user having a user ID of user32 is logged into an end-account on client device 602. The end-account is associated with a user community, and a CSC of 92466 is associated with the user community. Also, mobile device 604 has a telephone number of (444)444-4444. FIG. 6A shows a simplified example of short code extension associations prior to communication being initiated by mobile device 604. As shown in FIG. 6A, for phone number (444)444-4444, MS 606 stores an association for short code extension 401, but not for 402 or 403. Although associations for only two telephone numbers and three short code extensions are illustrated in FIGS. 6A-6D for the sake of simplicity, it is understood that associations for many more telephone numbers and short code extensions may be employed.

Figure 6B:
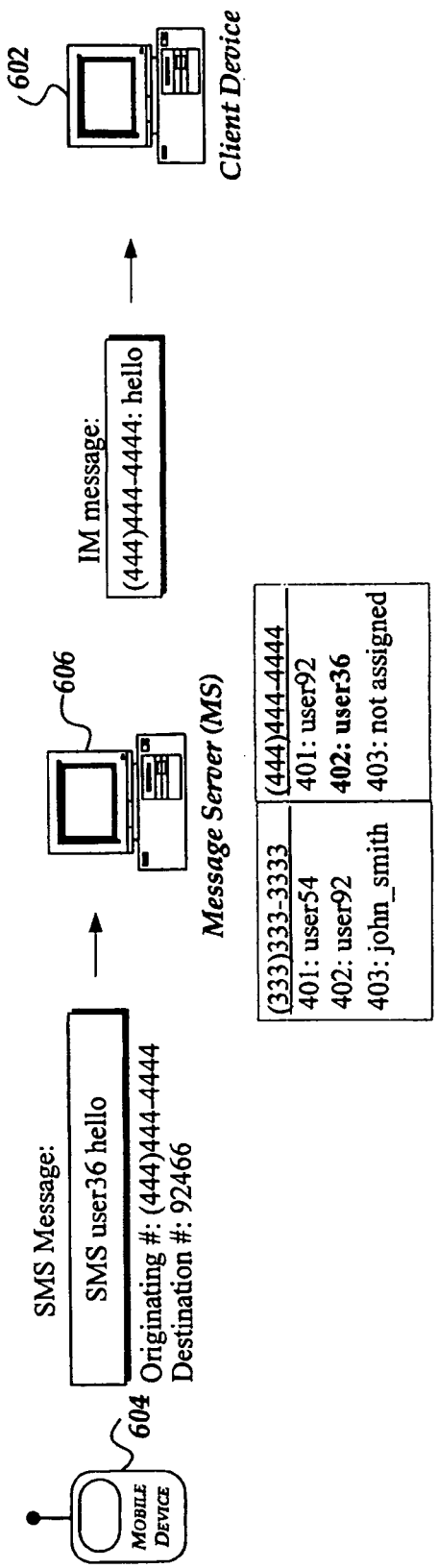

As shown in FIG. 6B, in one embodiment, mobile device 604 may send an SMS message that reads "SMS user36 hello" to 92466. Next, MS 606 receives the message, and determines whether user36 is a user in the user community. Subsequently, for telephone number (444)444-4444, MS 606 associates short code extension 402 with user36, as shown in FIG. 6B. The association is unique to telephone number (444)444-4444; short code extension 402 is associated with user92 for telephone number (333)333-3333. MS 606 then converts the SMS message into an IM message, and sends it to the client device 602 (where the user associated with user ID user32 is logged onto the account). Next, the user with a user ID of user36 receives an IM message that reads "hello" (and the sender is indicated to be (444)444-4444).

Figure 6C:
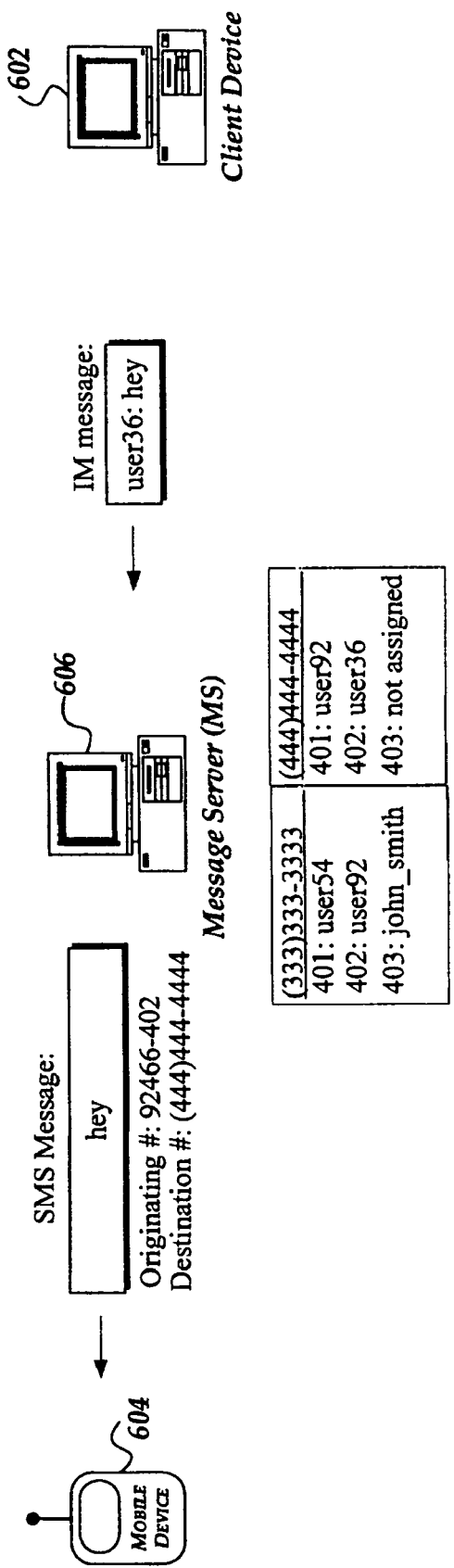

As illustrated in FIG. 6C, the user with a user ID of user36 responds to the message with another IM message reading, "hey". Subsequently, MS 606 converts this into another SMS message reading "hey" and sends this message using 92466-402 as the originating phone number, and using (444)444-4444 as a destination phone number.

Figure 6D:
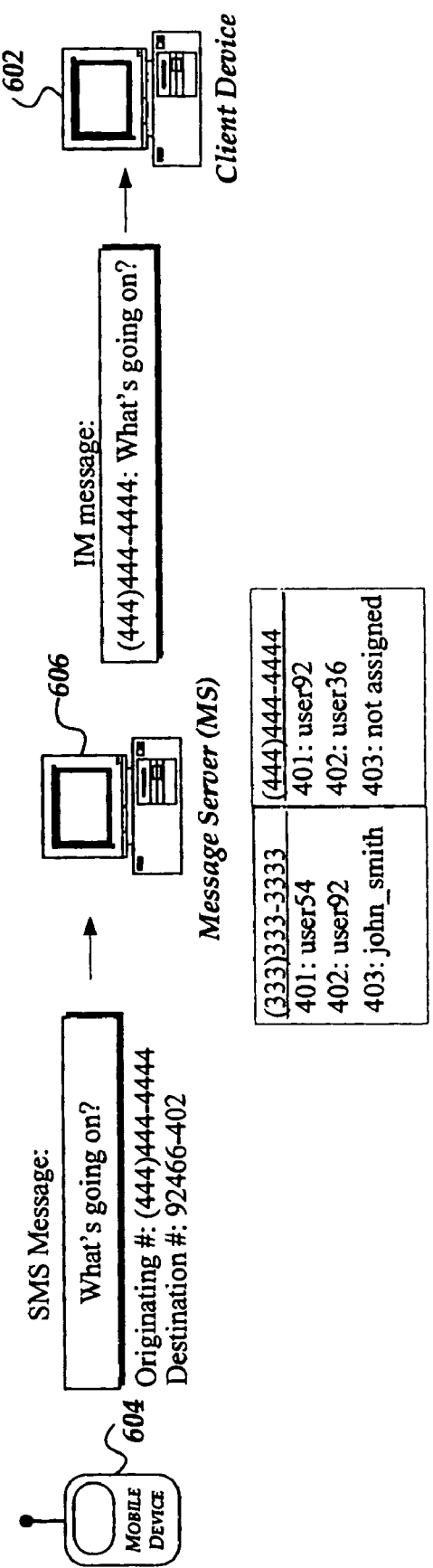

As shown in FIG. 6D, if the user of mobile device 604 responds with yet another SMS message reading "What's going on", this message is sent to 92466-402. The server receives the "What's going on" SMS message, and looks up short code extension 402 for telephone number (444)444-4444, and determines that user36 is the destination user ID. The server then converts the "What's going on" SMS message into an IM message reading "What's going on", and provides the IM message to client device 602.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method for communicating text messages over a network, comprising:
   enabling a user to author a first text message with a destination number that includes a common short code (CSC), wherein the CSC is assigned to an entity associated with a recipient of the first text message, and wherein the first text message includes at least an identifier for the recipient as a member of the entity;
   receiving the first text message for the recipient;
   associating a short code extension for the CSC with the identifier and an origination number for the first text message; and
   enabling the recipient to respond to the first text message with a second text message that employs the CSC and the short code extension as an origination number and the origination number for the first text message as a destination number for the second text message.

2. The method of claim 1, wherein at least one of the first text message and the second text message is at least one of a short message service (SMS) message, an internet relay chat (IRC) message, or an instant messaging (IM) message.

3. The method of claim 1, further comprising:
   if the second text message is generated by the recipient for responding to the first text message, employing a transport protocol to forward the second text message as an SMS message to the user, wherein the CSC and the short code extension are included as the origination number for the SMS message and the origination number of the first text message is included as the destination of the SMS message.

4. The method of claim 1, further comprising:
   in response to receiving the second text message, enabling the user to author a third text message with a destination number that includes the CSC and the short code extension as the destination number;

in response to receiving the third text message, employing the short code extension to determine the identifier associated with the short code extension; and
employing the determined identifier to provide at least a content of the third text message to the recipient.

5. The method of claim 1, wherein the entity is at least one of an instant messaging (IM) community, internet relay chat community, or an email community; and wherein the identifier is at least one of a user identifier, alias name, email address, or chat name.

6. The method of claim 1, wherein the first text message is a short message service (SMS) message.

7. The method of claim 6, wherein the first text message employs a syntax of "SMS <userID> <message>"and employs the CSC as the destination number, wherein <userID> represents the identifier, and wherein <message> represents a content of the first SMS message.

8. The method of claim 6, further comprising:
converting a format of the first text message into at least one of: an instant message (IM) format, email format, or internet relay chat format; and
providing the converted first text message to the recipient.

9. A server for communicating messages over a network, comprising:
a transceiver that is arranged to receive and transmit information on the network; and
a processor that is arranged to communicate with the transceiver, wherein the processor is arranged to enable actions, including:
receiving, from a user, a first text message with a destination number that includes a common short code (CSC), wherein the CSC is assigned to an entity associated with a recipient of the first text message, and wherein the first text message includes at least an identifier for the recipient as a member of the entity;
associating a short code extension for the CSC with the identifier and an origination number for the first text message; and
enabling the recipient to respond to the first text message with a second text message that employs the CSC and the short code extension as an origination number, and the origination number for the first text message as a destination number for the second text message.

10. The server of claim 9, wherein the processor is arranged to enable further actions, comprising:
if the second text message is generated by the recipient for responding to the first text message, employing a transport protocol to forward the second text message as an SMS message to the user, wherein the CSC and the short code extension are included as the origination number for the SMS message, and the origination number of the first text message is included as the destination of the SMS message.

11. The server of claim 9, wherein the processor is arranged to enable further actions, comprising:
in response to receiving the second text message, enabling the user to author a third text message with a destination number that includes the CSC and the short code extension as the destination number;
in response to receiving the third text message, employing the short code extension to determine the identifier associated with the short code extension; and
employing the determined identifier to provide at least a content of the third text message to the recipient.

12. The server of claim 9, wherein the first text message employs a syntax of "SMS <userID> <message>" and employs the CSC as the destination number, wherein <userID> represents the identifier, and wherein <message> represents a content of the first SMS message.

13. The server of claim 9, wherein the processor is arranged to enable further actions comprising:
converting a format of the first text message into at least one of: an instant message (IM) format, email format, or internet relay chat format; and
providing the converted first text message to the recipient.

14. A client for communicating message over a network, including:
a transceiver that is arranged to receive and transmit information on the network; and
a processor that is arranged to communicate with the transceiver, wherein the processor is arranged to enable actions, including:
enabling a user to author a first text message;
configuring the first text message such that a destination number of the first text message includes a common short code (CSC), wherein the CSC is assigned to an entity associated with a recipient of the first text message; and further configuring the first text message such that the first text message includes at least an identifier for the recipient as a member of the entity; and
sending the first text message.

15. The client of claim 14, wherein the processor is arranged to enable further actions comprising:
in response to receiving a second text message that includes the CSC and a short code extension as an origination number of the second text message, enabling the user to author a third text message;
configuring the third text message such that a destination number of the third text message includes the CSC and the short code extension; and
sending the third text message.

16. A mobile device for communicating messages over a network, comprising:
a transceiver that is arranged to receive and transmit information on the network through at least a wireless interface; and
a processor that is arranged to communicate with the transceiver, wherein the processor is arranged to enable actions, including:
enabling a user to author a first text message;
configuring the first text message such that a destination number of the first text message includes a common short code (CSC), wherein the CSC is assigned to an entity associated with a recipient of the first text message; and further configuring the first text message such that the first text message includes at least an identifier for the recipient as a member of the entity; and
sending the first text message.

17. The mobile device of claim 16, wherein the processor is arranged to enable further actions comprising:
in response to receiving a second text message that includes the CSC and a short code extension as an origination number of the second text message, enabling the user to author a third text message;
configuring the third text message such that a destination number of the third text message includes the CSC and the short code extension; and
sending the third text message.

18. A system for communicating messages over a network with a client-server architecture, comprising:

enabling a user to author a first text message with a destination number that includes a common short code (CSC), wherein the CSC is assigned to an entity associated with a recipient of the first text message, and wherein the first text message includes at least an identifier for the recipient as a member of the entity;

receiving the first text message for the recipient;

associating a short code extension for the CSC with the identifier and an origination number for the first text message; and enabling the recipient to respond to the first text message with a second text message that employs the CSC and the short code extension as an origination number and the origination number for the first text message as a destination number for the second text message.

19. The system of claim 18, further comprising:

in response to receiving the second text message, enabling the user to author a third text message with a destination number that includes the CSC and the short code extension as the destination number;

in response to receiving the third text message, employing the short code extension to determine the identifier associated with the short code extension; and employing the determined identifier to provide at least a content of the third text message to the recipient.

20. Computer-executable instructions embodied on a computer-readable medium for communicating messages over a network, the computer-executable instructions being configured to enable actions, comprising:

receiving, from a user, a first text message with a destination number that includes a common short code (CSC), wherein the CSC is assigned to an entity associated with a recipient of the first text message, and wherein the first text message includes at least an identifier for the recipient as a member of the entity;

associating a short code extension for the CSC with the identifier and an origination number for the first text message; and enabling the recipient to respond to the first text message with a second text message that employs the CSC and the short code extension as an origination number and the origination number for the first text message as a destination number for the second text message.

* * * * *

UNITED STATES PATENT AND TRADEMARK OFFICE
CERTIFICATE OF CORRECTION

| | | |
|---|---|---|
| PATENT NO. | : 7,245,929 B2 | Page 1 of 1 |
| APPLICATION NO. | : 11/175988 | |
| DATED | : July 17, 2007 | |
| INVENTOR(S) | : Henderson et al. | |

It is certified that error appears in the above-identified patent and that said Letters Patent is hereby corrected as shown below:

Column 8, lines 5-6, delete "protcoUlInternet" and insert -- protocol/Internet --, therefor.

Column 13, line 14, in Claim 7, delete "<message>"and" and insert -- <message>" and --, therefor.

Signed and Sealed this

Second Day of October, 2007

JON W. DUDAS
*Director of the United States Patent and Trademark Office*